(12) United States Patent  (10) Patent No.: US 8,544,857 B2
Schnarr et al.  (45) Date of Patent: Oct. 1, 2013

(54) FOLDABLE WHEELED CONTAINER

(76) Inventors: Randy Schnarr, Southampton (CA); Bryon Haddock, Toronto (CA)

( * ) Notice: Subject to any disclaimer, the term of this patent is extended or adjusted under 35 U.S.C. 154(b) by 211 days.

(21) Appl. No.: 12/894,455

(22) Filed: Sep. 30, 2010

(65) Prior Publication Data

US 2011/0074124 A1   Mar. 31, 2011

Related U.S. Application Data

(60) Provisional application No. 61/247,268, filed on Sep. 30, 2009.

(51) Int. Cl.
 *B62D 3/02* (2006.01)
 *B62D 7/06* (2006.01)

(52) U.S. Cl.
 USPC .............. 280/30; 280/38; 280/650; 280/651

(58) Field of Classification Search
 USPC .................. 280/30, 35, 40, 42, 47.17, 47.18, 280/47.24, 47.26, 47.27, 639, 642, 645, 652
 See application file for complete search history.

(56) References Cited

U.S. PATENT DOCUMENTS

| | | | |
|---|---|---|---|
| 1,348,145 A | 8/1920 | Arden | |
| 1,718,962 A | 7/1929 | Kimball | |
| 2,212,053 A | 8/1940 | Smith | |
| 2,555,767 A | 6/1951 | Simonian | |
| 2,577,290 A * | 12/1951 | Underwood | 280/646 |
| 2,905,482 A * | 9/1959 | Ruttger | 280/47.24 |
| 3,348,857 A | 10/1967 | Rollin | |
| 4,448,434 A | 5/1984 | Anderson | |
| D287,779 S | 1/1987 | Slany | |
| 4,834,403 A * | 5/1989 | Yanus et al. | 280/30 |
| 4,872,692 A * | 10/1989 | Steenburg | 280/30 |
| 4,989,889 A | 2/1991 | Server Perez | |
| 6,062,648 A * | 5/2000 | Adler | 297/440.24 |
| 6,126,183 A | 10/2000 | Lensing | |
| 7,267,359 B1 * | 9/2007 | Yang et al. | 280/642 |
| 7,374,237 B2 | 5/2008 | Park et al. | |
| 7,537,187 B2 | 5/2009 | Park et al. | |
| 2007/0096434 A1 | 5/2007 | Haeggberg | |
| 2009/0127828 A1 * | 5/2009 | Longenecker et al. | 280/650 |
| 2009/0194973 A1 * | 8/2009 | Wang | 280/642 |

OTHER PUBLICATIONS

Canadian Intellectual Property Office as International Search Authority, International Search Report and Written Opinion for PCT/CA/2010/001556, Jan. 12, 2011.

* cited by examiner

*Primary Examiner* — J. Allen Shriver, II
*Assistant Examiner* — Bridget Avery
(74) *Attorney, Agent, or Firm* — Jeffrey W. Wong; Borden Ladner Gervais LLP

(57) ABSTRACT

A foldable wheeled container having a frame; at least two wheels connected to the frame; a tensioning cable housed within the frame; a plurality of hinge points, wherein when the frame rotates around the hinge point the tensioning cable is aligned; and a locking mechanism which tighten and locks the tensioning cable in its tightened position to form a rigid structure. A stroller having a similar structure including a frame; at least four wheels connected to the frame; a tensioning cable integrally connected to the frame; a plurality of hinge points, wherein when the frame rotates around the hinge point the tensioning cable is aligned; and a locking mechanism which tightens and locks the tensioning cable in its tightened position.

17 Claims, 16 Drawing Sheets

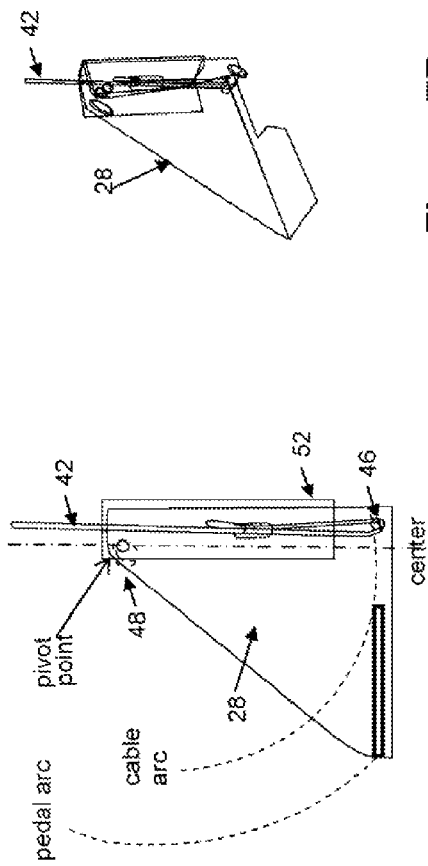
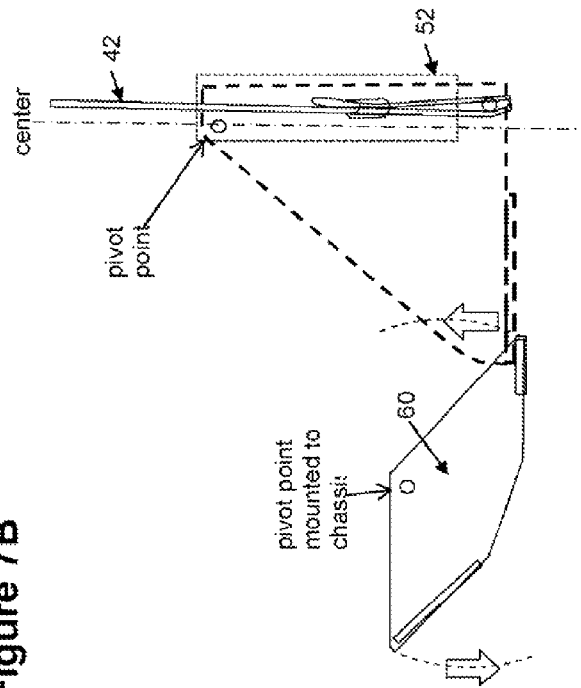
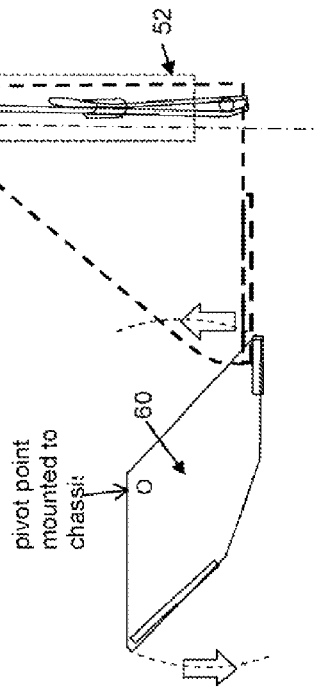
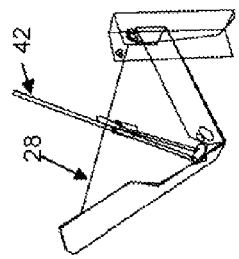
Figure 7A
Figure 7B
Figure 7C
Figure 7D

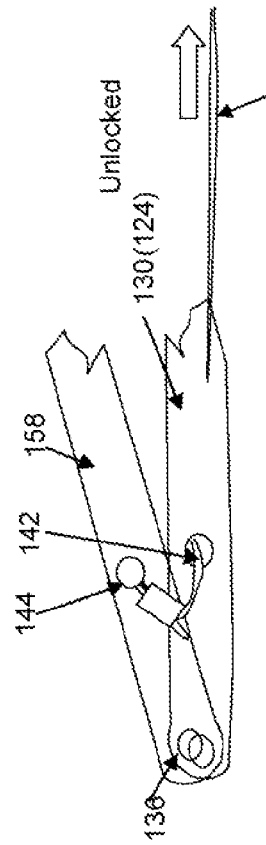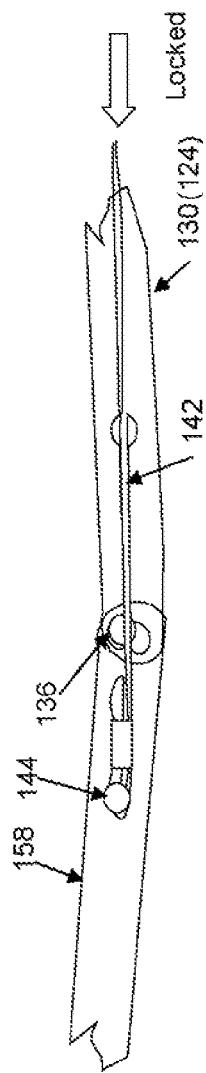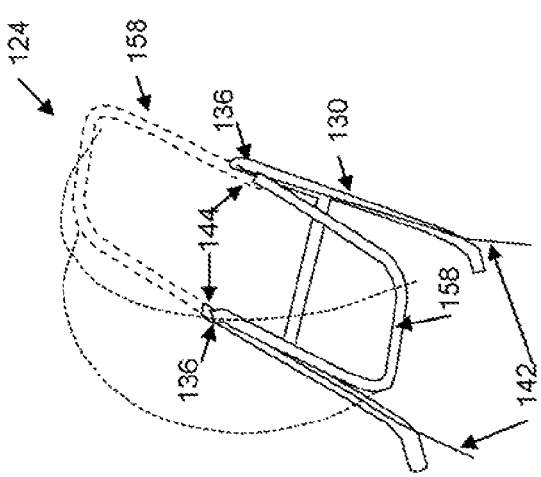

FOLDABLE WHEELED CONTAINER

CROSS-REFERENCE

This application claims the benefit of U.S. Provisional Application No. 61/247,268 filed Sep. 30, 2009, which is incorporated herein by reference.

FIELD

The present document relates generally to a container and more particularly to a foldable wheeled container.

BACKGROUND

In an effort to reduce waste, reusable bags and carrying cases have gained popularity. Some reusable carrying cases or containers are equipped with wheels and may allow easier transportation of heavier goods.

Conventional wheeled containers or carts often resemble portable shopping carts whether in an open or closed position. These conventional containers can be awkward to carry and store in either a folded or unfolded positioned. Many conventional wheeled containers require several steps to either fold or unfold the container.

Therefore there is provided a novel wheeled container, which can be used in both a folded and unfolded position.

SUMMARY

There is a need for a foldable wheeled container that folds and unfolds simply and quickly. There is a further need for a foldable wheeled container that is able to fold and unfold around hinge points and may be locked into a rigid structure through the use of tensioning cable. There is a provided a lightweight shopping cart that may be folded to appear as a handbag or purse.

In a first aspect, a foldable wheeled container is provided having a frame; at least two wheels connected to the frame; a tensioning cable housed within the frame; a plurality of hinge points, wherein when the frame rotates around the hinge point the tensioning cable is aligned; and a locking mechanism which tightens and locks the tensioning cable in its tightened position to form a rigid structure.

In a further embodiment, there is provided a stroller having a frame; at least four wheels connected to the frame; a tensioning cable connected to the frame; a plurality of hinge points, wherein when the frame rotates around the hinge point the tensioning cable is aligned; and a locking mechanism which tightens and locks the tensioning cable in its tightened position to form a rigid structure.

Other aspects and features of the foldable wheeled container will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein:

FIGS. 7A to 7D illustrate the foot actuator according to one embodiment;

FIGS. 12A to 12C illustrate the hand actuator of the foldable wheeled container;

DETAILED DESCRIPTION

In one embodiment, there is provided a foldable wheeled container that includes may have three different functions including a handbag or briefcase in a folded position or compact position, a wheeled storage container or shopping cart having at least one storage compartment when the frame is in an unfolded position, and a hand truck or dolly when the at least one storage compartment is collapsed in the unfolded position In another aspect there is provided a foldable wheeled container that may be unfolded in a simple fluid motion and activated by a locking mechanism.

Figure 1:
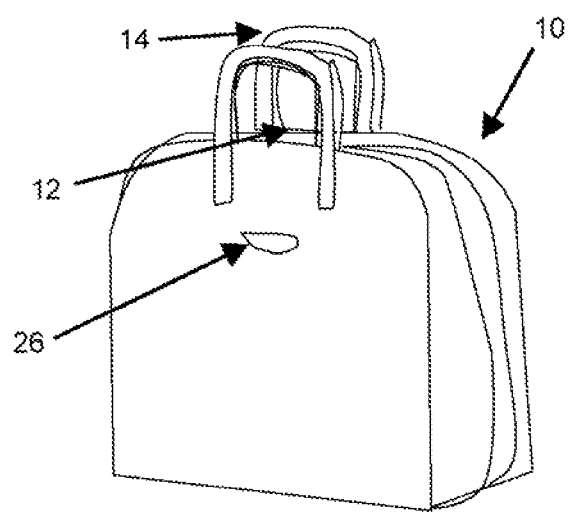
FIG. 1 illustrates the foldable wheeled container in a folded position according to one embodiment.

FIG. 1 illustrates the foldable wheeled container (10) in a folded position. In the folded position, the foldable wheeled container (10) may resemble a handbag or briefcase and remain in a compact form. The foldable wheeled container (10) may include a purse-like capacity section (12), discussed in more detail below, and may include a traditional style handle (14). Other handles may also be included or used, for example, a shoulder strap or backpack strapping. From the folded position, a retaining device (26) or a locking device can be seen, which may hold the foldable container (10) in the folded position. The retaining device (26) may be, for example a snap or rotatable fastener, hooks or hook and loop fastener, a latch, a tie or magnets.

Figure 2:
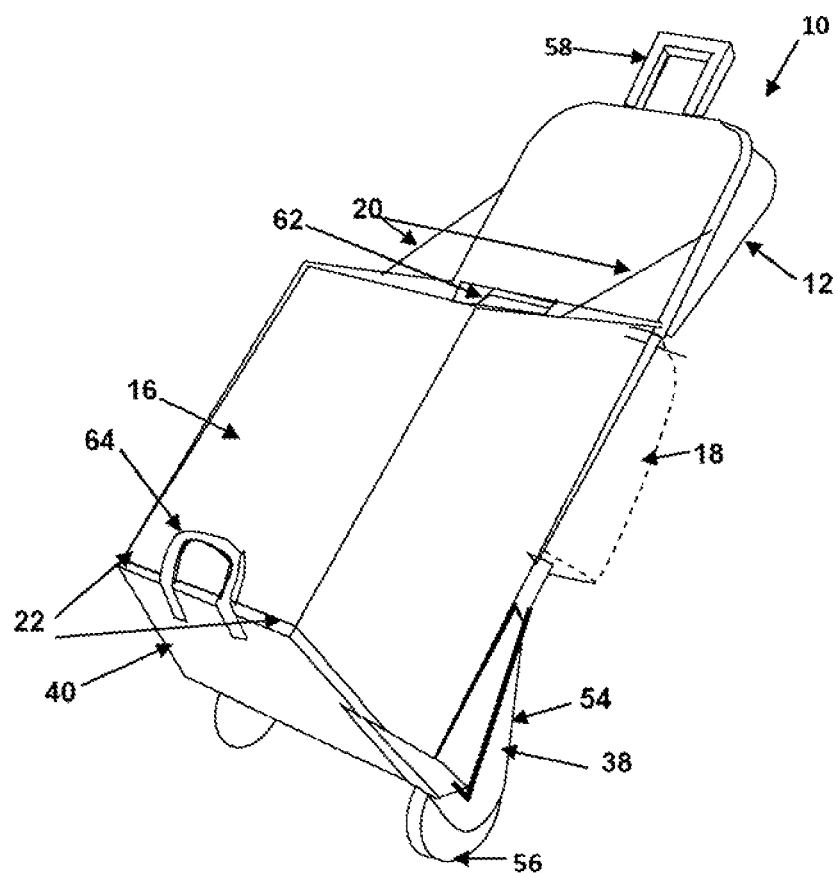
FIG. 2 illustrates the foldable wheeled container in an unfolded position.

FIG. 2 illustrates the foldable wheeled container (10) in another functional position or use, such as a two-wheeled shopping cart. In this position, the foldable wheeled container (10) has a plurality of storage compartments. The storage compartments include a larger capacity main compartment (16) and the smaller capacity purse-like compartment (12). The larger capacity main compartment (16) may be attached to a frame of the foldable wheeled container (10) via upper retainers (20) and lower retainers (22). These retainers may be snaps, or hooks or may be similar in form to the retaining device (26) as described above. An optional middle compartment (18) may be added to the foldable wheeled container (10) for added capacity. This middle compartment (18) may be an insulated or padded pouch to allow for protection or to retain the temperature for either cold or hot items. In one embodiment, this middle compartment (18) may be about a quarter of the size of the main storage compartment (16). The storage compartments may be constructed of a strong yet low bulk synthetic woven fabric such as nylon or mylar, although alternatives, for example cotton, are contemplated.

Figure 3:
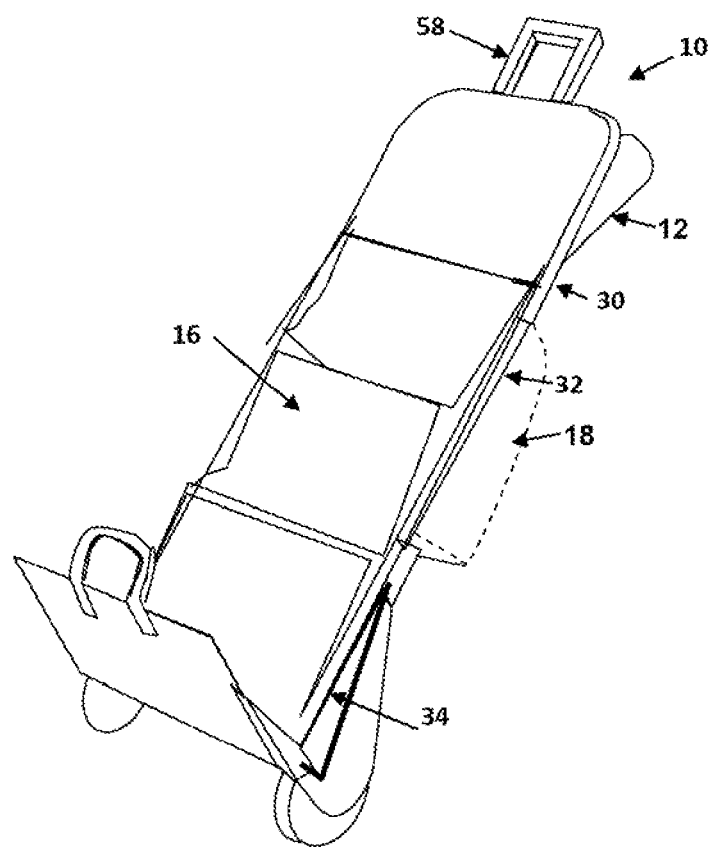
FIG. 3 illustrates the foldable wheeled container in hand truck position.

A third functional position is shown in FIG. 3. If the user of the foldable wheeled container (10) needs to transport a bulkier item such as a large cardboard box or other package, the foldable wheeled container (10) may be converted to a hand truck or dolly position. Although the larger capacity main compartment (16) remains inaccessible, as it is collapsed, when used as a hand truck or dolly, the purse-like compartment (12) may remain accessible. If the middle compartment (18) is included in the foldable wheeled container (10), the middle compartment (18) may also be accessible from the back of the foldable wheeled container (10).

Figure 4:
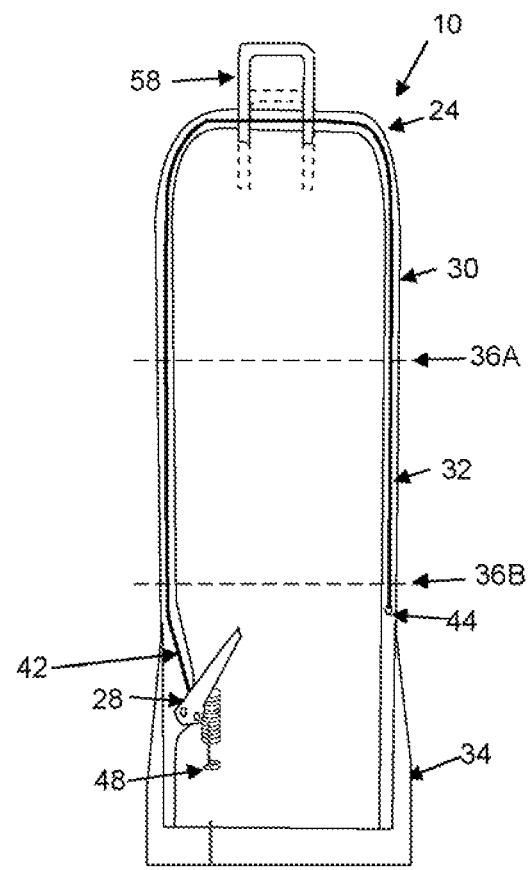
FIG. 4 illustrates the frame of the foldable wheeled container according to one embodiment.
Figure 5A:
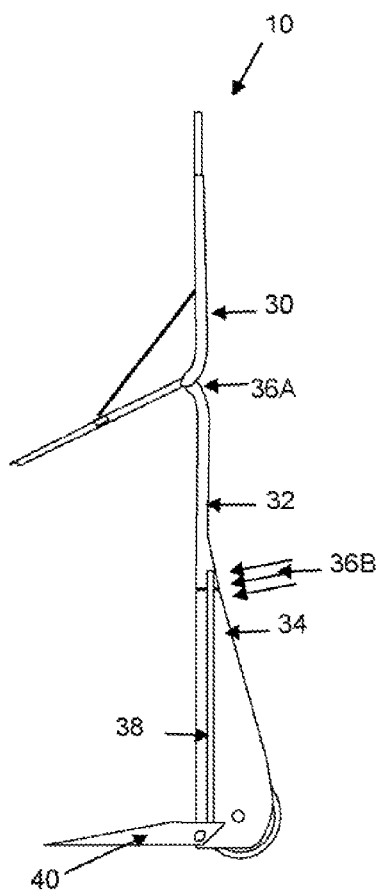
FIGS. 5A, 5B and 5C illustrate the folding of the foldable wheeled container.
Figure 5B:
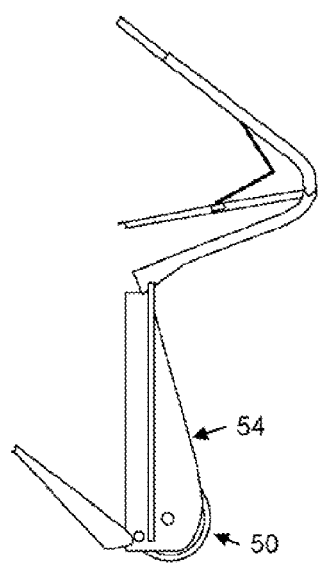
Figure 5C:
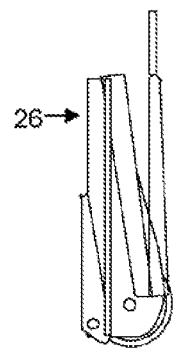

FIG. 4 illustrates a frame (24) of the foldable wheeled container (10) without the storage compartments (12, 16 and 18). In the current embodiment, the frame (24) is in three main sections, an upper section (30), a middle section (32) and a lower section (34). The adjustment of the frame from one position to another is intended to be intuitive and controlled while requiring few hand motions. The change from the folded position to unfolded position, as shown in FIGS. 5A to 5C, is achieved by disconnecting the retaining device (26) and allowing the foldable wheeled container (10) frame sections to unfold. Once unfolded, the wheeled container (10) is locked into the unfolded position by engaging a locking mechanism, for example, a foot operated actuator (28). The locking mechanism may also be a hand actuator located at the side or top of the frame of the foldable wheeled container (10). The locking mechanism will lock the foldable wheeled container (10) in the unfolded position to provide a structurally stable chassis. The frame (24) may be constructed of a material of suitable strength, for example tube steel, tube aluminum, tube carbon fiber or injection moulded plastic which may include carbon fiber technology.

To change the unfolded wheeled container (10) from the shopping card position into a hand truck position as shown in FIG. 3, the user disconnects the main compartment (16) from its upper retainers (20) and lower retainers (22) and then tucks in the main compartment (16) so that the main compartment (16) lays flat against the frame (24).

With reference to previously described FIG. 4, to fold the wheeled container (10) a user may disengage the foot actuator (28) to allow the upper (30) and middle (32) frame sections to fold systematically at hinge or pivot points (36), which allows the foldable wheeled container (10) to fold back into the handbag position as shown in FIG. 1. The user may then fasten the retaining device (26) to maintain the foldable wheeled container (10) in the folded position. During the folding and unfolding process, mechanical links, one which may be included in the upper retainer (20) and another may be a lower mechanical link (38) can be used to open or close the main storage compartment (16) and open or close a bottom panel (40), of the wheeled container cart (10), through an approximately 90 degree rotation to the side elevation of the lower frame section (34). The bottom panel (40), when open, opens the lower portion of the main storage compartment (16) to receive goods and may enable a free-standing feature which is enabled by resting the bottom panel (40) on the ground.

In one embodiment, the locking mechanism is based on a tensioning cable (42), which is locked by the foot actuator (28), such as a foot activated over-center toggle or ratcheted mechanism. The locking mechanism and unfolding action are shown in greater detail in FIGS. 6 and 7, which illustrate the movement of hinge point (36) and the foot actuator (28).

Referring to FIGS. 5A to 5C, the folding method is illustrated using an over-center toggle foot actuator (28) to tighten the tensioning cable (42) within the frame (24), which locks the foldable wheeled container (10) into the unfolded position (shown in FIG. 2). The cable may be for example a wire cable or a carbon fiber cable and may be fabricated either through braided or wound strands or in a rod form. Further the tensioning cable (42) may be either a single or double cable. A polyester cable may be used but may not be preferred as the polyester cable may stretch to an unacceptable level.

The tensioning cable (42) is attached to the lower frame section (34) in at least one location (44), visible in FIG. 4. The tensioning cable (42) may also be operatively connected to the foot actuator (28) at connector (46) (shown in FIG. 7A). A biasing mechanism, for example a wind up or coil spring (48) may be used to collect slack cable and move the foot actuator (28) into a position for activation by a user's foot.

As described above, and shown in FIGS. 5A to 5C, the foldable wheeled container cart (10) may be folded by pivoting the frame around the hinge points (36). Prior to folding, items stored in the main compartment (16) and optional middle compartment (18) should be removed. Items in the smaller purse-like storage compartment (12) may remain in the foldable wheeled container (10) as this compartment is still accessible in the folded position. To fold the wheeled container (10), the cable (42) may be released by lifting and disengaging the foot actuator (28). Once disengaged, the cable will loosen around the hinge points (36) allowing the frame to fold. Also, when the foot actuator is disengaged, the cable slack may be held by the biasing mechanism (48). To fold the frame, the user may press against the lower hinge point (36B) between the lower frame section (34) and middle frame section (32). Once this hinge point begins to be engaged, the upper frame section (30) rotates or pivots towards the middle frame section (32). Once folded, the user may engage the retaining device (26), tuck in excess material from the storage compartments and the foldable wheeled container (10) is then in the form of a handbag or briefcase.

FIGS. 6A to 6E illustrate the unfolding motion with respect to a single hinge point (36). In this example the hinge point (36) may be the right side hinge point (36) between the upper frame section (30) and middle frame section (32). The frame sections may be connected directly to each other in a rotatable fashion, or the frame (24) may incorporate separate stopping mechanisms (37A) or hinges (37B) that connect the frame sections together. If hinges (37B) are included, the frame sections will abut against the hinge or stop (37) in a locked position, restraining further movement of the frame (24).

Figure 6C:
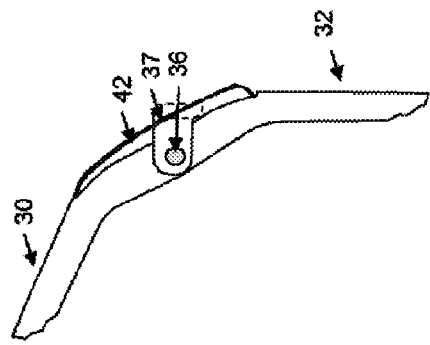
FIGS. 6A to 6E illustrate the movement about a hinge point.
Figure 6E:
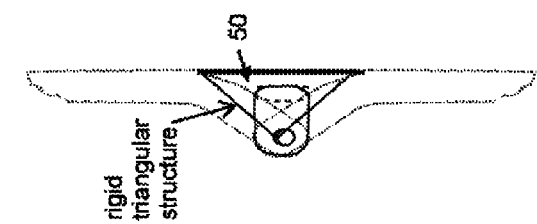
Figure 6B:
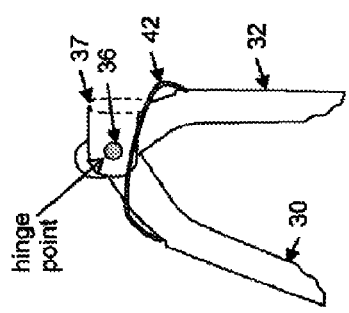
Figure 6D:
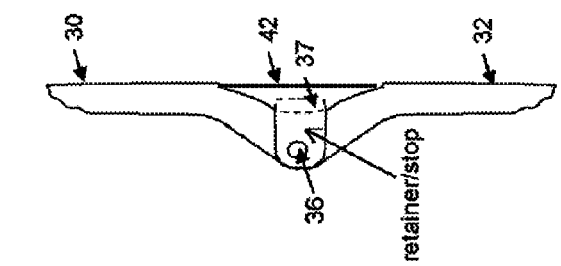
Figure 6A:
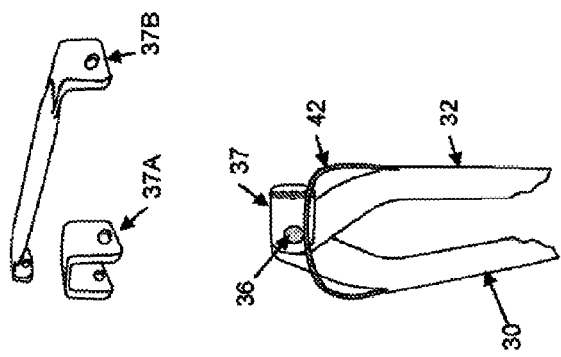

As the locking mechanism is engaged it gathers any extra cable length of the tensioning cable (42) to provide rigidity to the unfolded frame using triangulation at the hinge points (36). From FIGS. 6A to 6D, it can be seen that when the frame (24) is unfolded, the cable (42) aligns and pulls the various frame sections in a similar manner. The hinge point (36) allows the frame sections to pivot or rotate around the hinge point (36) and be pulled together at the hinge point (36), which stops at a retaining stop in a roughly triangular structure (50) as shown in FIG. 6E. As each hinge point (36) will be subject to a similar triangular structure (50), the frame (24) becomes a rigid structure when the tensioning cable (42) is drawn tight. The cable (42), whether a single or double cable, may lock all hinge points (36) in a single action.

The locking and unlocking of the foot actuator is shown in FIGS. 7A to 7C. The foot actuator (28) may be attached to the frame (24) via a mounting bracket (52). The foot actuator (28)

draws in the excess cable when the structure is unfolded providing rigidity to the structure. The tensioning cable (42) is held in place by pulling the cable connection point (46) on the foot actuator (28) to an over-center position. The tension on the cable (42) holds the foot actuator (28) in place until the foot actuator (28) is disengaged to reverse the locking action, as shown in FIG. 7C.

The foot actuator may further include a release pedal (60), which when pressed may disengage the tensioning cable (42). The release pedal (60) may be operatively connected to the foot actuator (28). When the foot pedal (60) is in the locked position (as shown in FIG. 7B), the release pedal (60) may extend from the foot actuator (28) and may pivot or rotate around an axis, the axis may be approximately orthogonally related to the axis of the foot actuator's (28) movement.

In the alternative, the release mechanism may include a secondary hand operated actuator. The tensioning cable (42) may link to a hand lever such as the secondary hand operated actuator, and this hand lever may pull the foot actuator (28) from the over-center locked position to unlock the foldable wheeled container. The foot actuator (28) may also be released, by a user lifting the foot actuator (28) to unlock the foot actuator (28) from the locked position.

Figure 8:
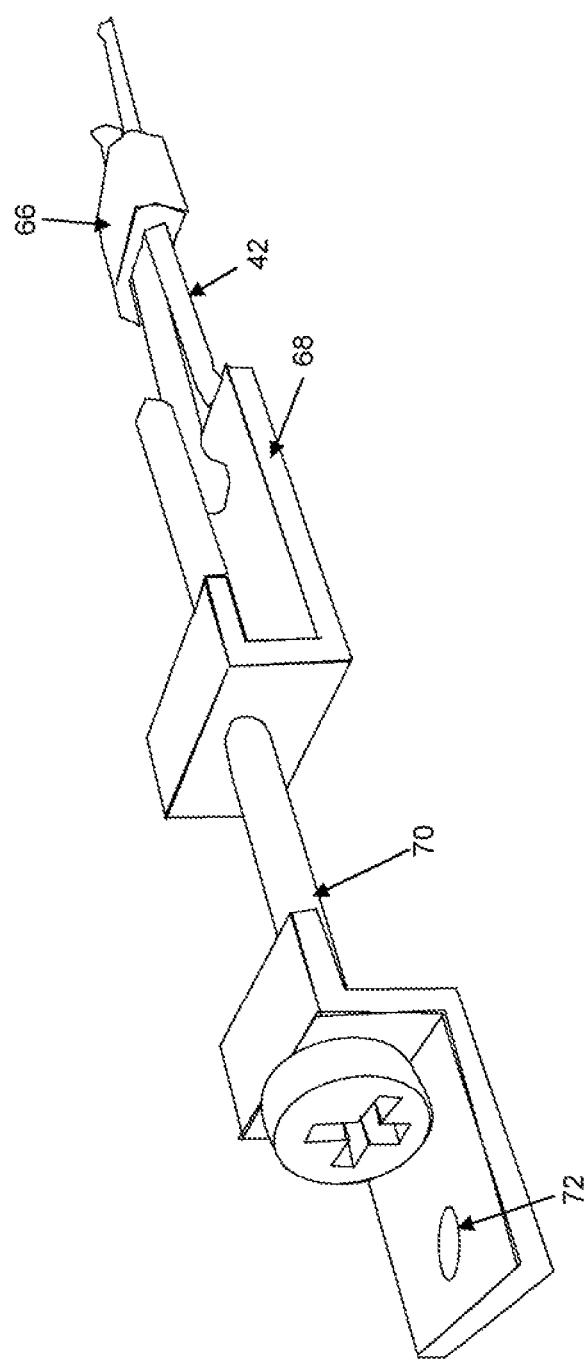
FIG. 8 illustrates the cable tensioning device.

There is provision for a cable tension adjustment device, as shown in FIG. 8, if the cable stretches over time. The device may include a cable fastener (66), which holds the tensioning cable (42) in place. A nut, or threaded bracket (68) is attached through the tensioning cable loop that is created by the cable fastener (66). The threaded bracket (68) is operatively connected to a bolt (70). As the threaded bracket (68) is tightened with respect to the bolt (70), the tensioning cable (42) is stretched to occupy the additional area created by the tightening of the threaded bracket (68). As a result, the tensioning cable (42) is tightened around the frame (24). The cable tensioning device may be anchored to the frame (24) by way of screw (72) or other fastener.

Other features may also be included in the foldable wheeled container (10) including lead-in guides (54) for a set of wheels (56), as previously shown in FIG. 2. The lead-in guides (54) may allow the wheeled container cart to ride up over curbs and steps more easily than a container cart without lead-in guides. Further, the frame (24) and the foldable wheeled container (10) itself, may have sides free of protrusions to avoid snagging on fixed objects.

The foldable wheeled container (10) may include a pull handle (58), as shown previously in FIG. 4, which may be recessed into the upper frame section (30) for storage in tight spaces. The pull handle (58) may be pulled out to the length desired by the user, and held in place at specific positions (not shown). This pull handle (58) may extend sufficiently, in order that taller users are not required to slump when making use of the foldable wheeled container (10) in the unfolded position.

Shown previously in FIG. 2, the foldable wheeled container (10) may further include a second cross-bar or handle (62) located near the middle of the foldable wheeled container (10) when in the unfolded position. The second handle (62) creates a second gripping point where the user can carry, rather than pull the foldable wheeled container (10) up stairs. This second handle (62) may be used when the user wishes to lift the foldable wheeled container (10) for example, when entering or exiting a bus or up and down stairs.

Also shown previously in FIG. 2, the foldable wheeled container (10) may include a third handle (64) attached to the bottom panel of the foldable wheeled container (10). This handle is intended to facilitate a tilt and lift into an automobile trunk or back seat. By tilting the top end of the foldable wheeled container cart onto the rear deck of an open trunk and lifting the lower third handle (64), the user needs to lift only a portion of the total weight. Both of these handles (62, 64) are optional but are intended to provide easier maneuverability for the foldable wheeled container (10).

Figure 9:
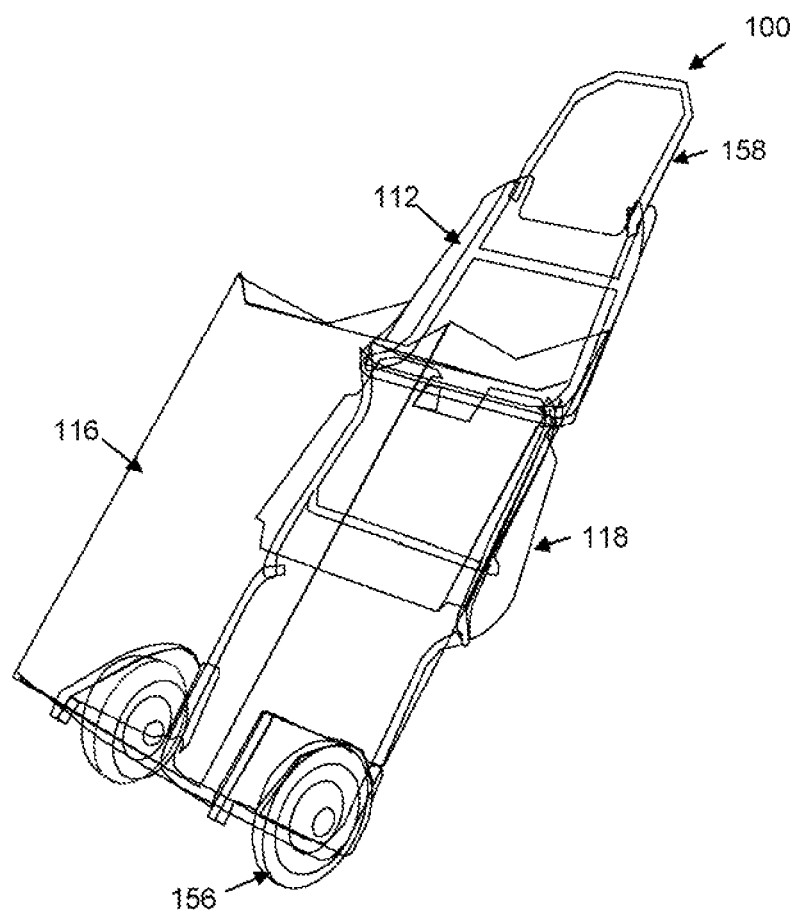
FIG. 9 illustrates the foldable wheeled container according the another embodiment.

Another embodiment of a foldable wheeled container (100) is shown in FIG. 9, in an unfolded position. The foldable wheeled container (100) includes a smaller top storage compartment (112) and a larger main storage compartment (116). An optional middle compartment (118) may be included and may be accessible from the rear of the foldable wheeled container (100). As in the first embodiment, the wheeled container cart (100) includes wheels (156).

Figure 10:
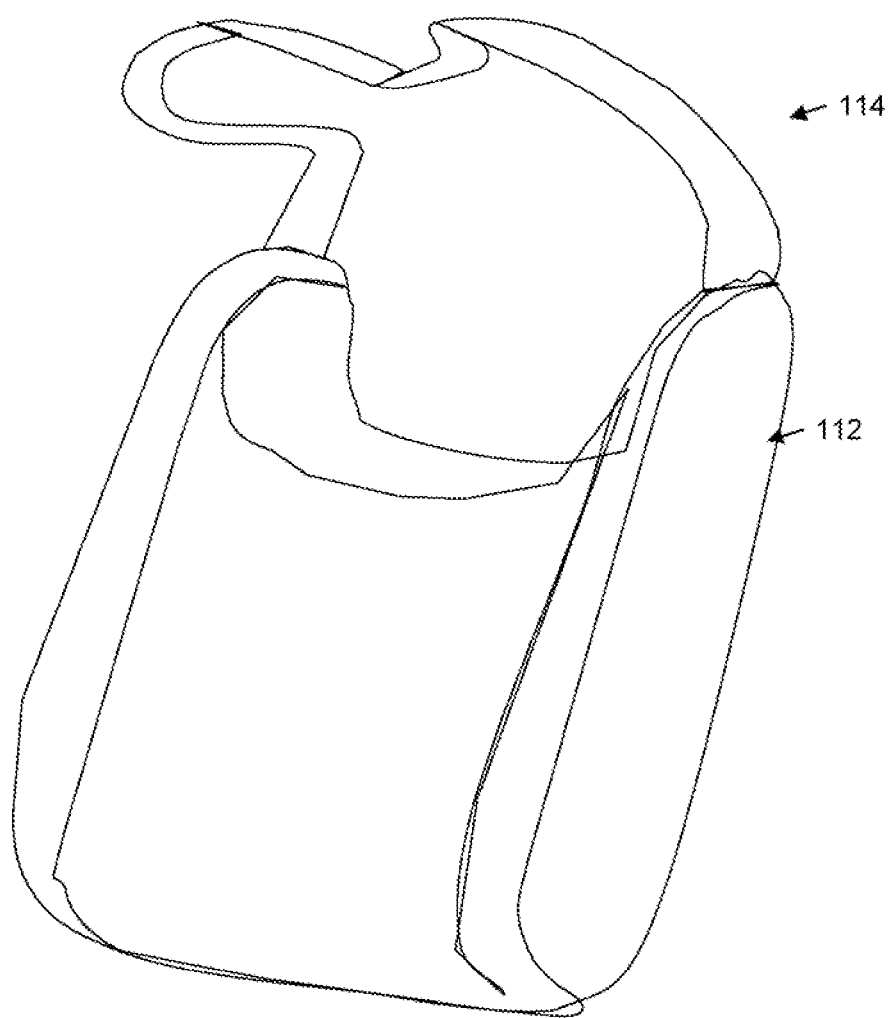
FIG. 10 illustrates the foldable wheeled container of FIG. 9 in a folded position.

FIG. 10 illustrates the folded position of the foldable wheeled container (100) of FIG. 9. A shoulder strap (114) may be attached and, when in folded position, the top storage compartment (112) may have a scooped opening, for easy access and to allow the foldable wheeled container (100) to further resemble a purse.

Figure 11:
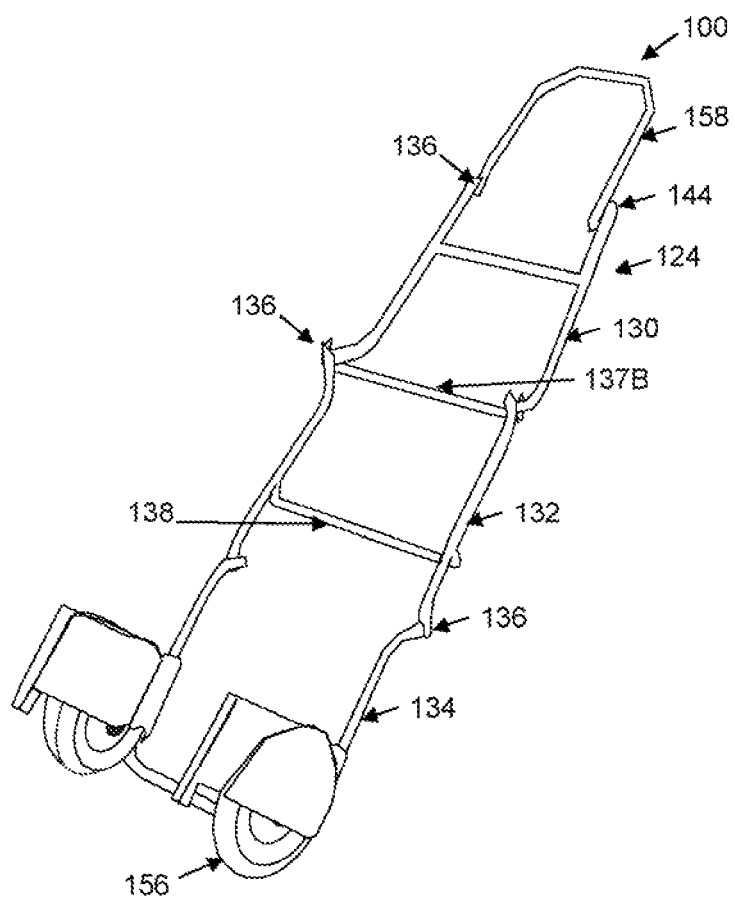
FIG. 11 illustrates the frame of the foldable wheeled container of FIG. 9

FIG. 11 illustrates a frame (124) of the foldable wheeled container cart (100). The frame may include an upper section (130), a middle section (132) and a lower section (134). The sections may be hingedly connected through hinge or pivot points (136). The frame may further include reinforcement bars (138) which may provide further structure and stability to the frame (124). The wheeled container (100) folds and unfolds at hinge points (136) to switch from the unfolded container position to the folded position. The frame (124) pivots or rotates around the hinge points (136) in a similar manner to that described above.

FIGS. 12A to 12C illustrate a handle activated locking mechanism for wheeled container (100). The frame (124) houses a tensioning cable (142), similar to the tensioning cable described above. In this embodiment, the tensioning cable (142) may be connected at two locations (144) on either side of the handle (158). As described above, the tensioning cable (142) will tighten around the hinge points (136) when the handle is pivoted to the locked position. The handle (158) may abut against the upper section (130) of the frame (124) which holds the handle (158) in position, and holds the tensioning cable (142) tight around the hinge points (136). The various sections of the frame (124) may further include a hinge or stopping mechanism (137). The frame sections (130, 132, 134) may abut against the hinges or stops (137) when the foldable wheeled cart (100) is in the unfolded position and are intended to help create, or provide a rigid triangular structure between the hinge point (136), the adjacent frame sections and the tensioning cable (142). Movement of the hinge is contained by an additional mechanical retainer or mechanical stop which is operatively connected to the frame (124).

The tensioning cable (142) may include slack when the foldable wheeled container (100) is in the folded position and the handle (158) is folded and in towards the body of the frame (124) and lies adjacent to the upper section (130) of the frame. When the handle (158), is unfolded the tensioning cable (142) is aligned, tightened and locked in a rigid triangular structure (150). When a user wishes to unfold the wheeled container (100), the user may hold the frame (124) and allow the frame (124) of the foldable wheeled container (100) to unfold by gravitational pull. To lock the frame (124) into the unfolded position, the user would lift the pull handle (158) up to lock the handle (158) into place, thus locking the foldable wheeled container (100) into the unfolded position. The handle (158) may be rotated in the opposite direction to remove the cable tensioning provided by the tensioning cable (142). When the tension is removed, the foldable wheeled container (100) will fold as described above.

Figure 13A:
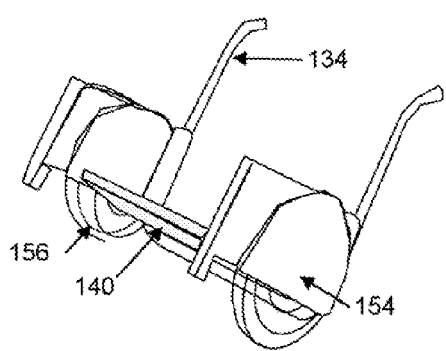
FIGS. 13A and 13B illustrate the folded and unfolded position of the wheels according to one embodiment.
Figure 13B:
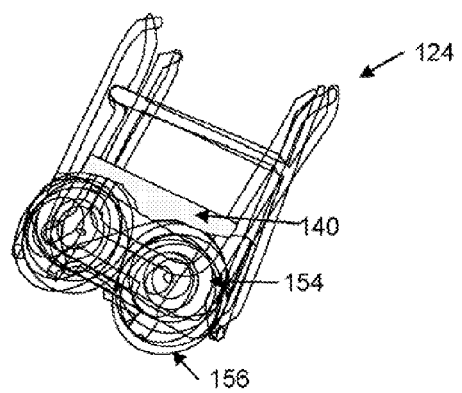

FIGS. 13A and 13B illustrate the lower portion (134) of the frame (124) of the foldable wheeled container (100). The wheels may be attached to a pivotable wheel frame (154). This pivotable wheel frame (154) may be connected to the lower portion (134) of the frame (124). When the tensioning cable (142) is moved to a locked position, the wheel frame (154) will rotate away from the frame (124) and lock the wheels (156) into a useable position. When the tensioning cable (142) is unlocked and the frame (124) is returned to a folded position, as shown in FIG. 12B, the wheel frame (154) rotates towards the frame. By including a pivotable wheel frame (154) for the wheels (156) the foldable wheeled container (100) may include larger wheels in the same folded frame size compared to a wheeled container where the wheels do not pivot. The pivoting motion may be attainable from either a handle activated locking mechanism or the foot actuator described above. In one case, radial wound springs may move the wheels to the folded position when the tensioning cable (142) has slack in the unlocked position. In this embodiment, a bottom panel (140) folds into place between the wheels (156) when the foldable wheeled container (100) is in the unfolded position.

In an alternative embodiment, the design can be scaled to suit a variety of capacity and style needs. It will be understood that the sizes of the storage compartments and the dimensions of the frame may be changed without reducing the functionality of the foldable wheeled container.

In another alternative embodiment, the foldable wheeled container may include a hang up hook so that the foldable wheeled container may be hung on a closet rod, a wall hook or a grocery store cart. It may also be used to hang the foldable wheeled container on a bicycle rack for transport through streets or bike pathways.

Figure 14C:
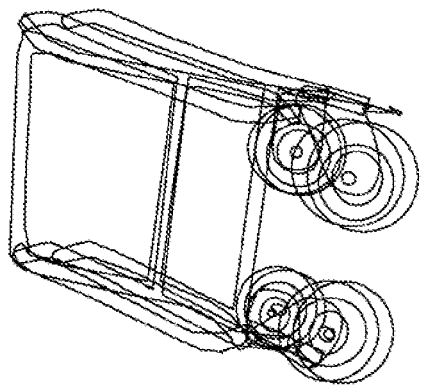
FIGS. 14A to 14C illustrate the foldable wheeled container in another embodiment
Figure 14B:
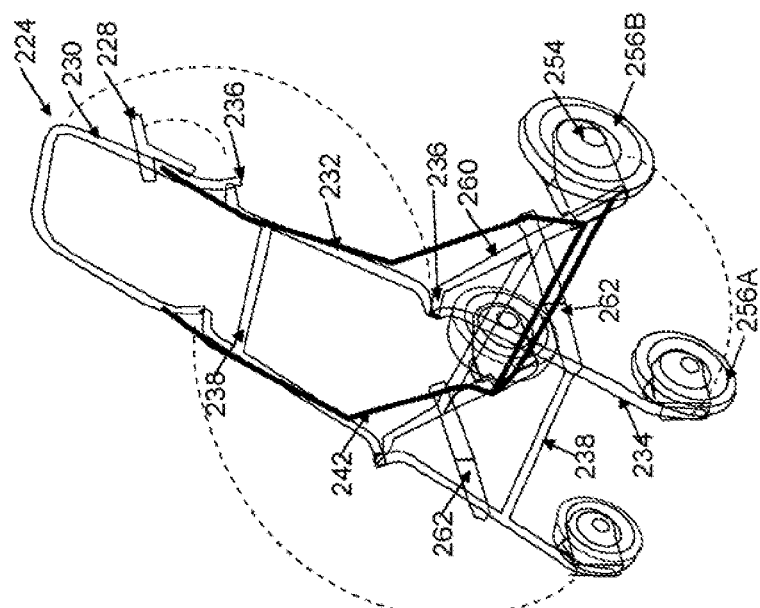
Figure 14A:
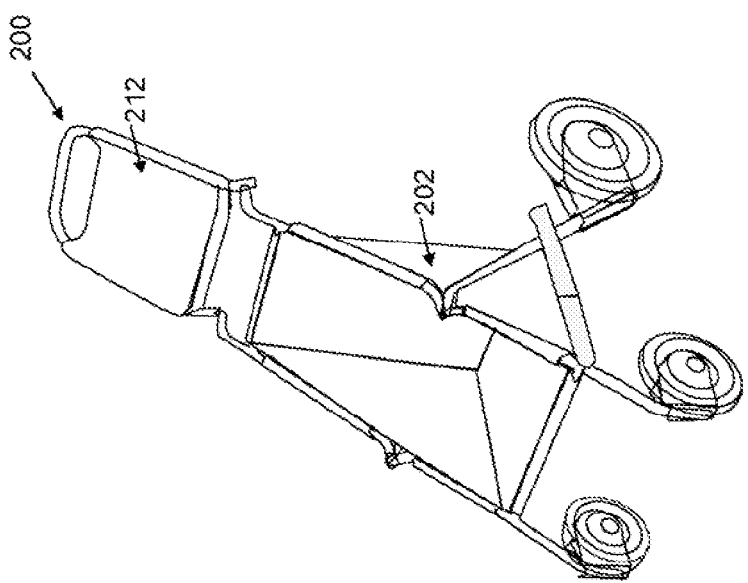

As shown in FIG. 14, the foldable wheeled container (200) may be modified to provide a stroller with a stroller seat compartment (202) and storage compartment (212) in an unfolded position. In this embodiment the frame (224) includes upper (230), middle (232) and lower (234) sections as in the previous embodiments, and further includes hinge points (236) between the frame sections. Cross-bars (238) may be included to provide greater support for the frame (224). The frame may further include a back wheel frame addition (260), which may house back wheels (256b). Front wheels (256a) may be smaller than the back wheels (256b), as shown. The back wheel frame addition (260) may be connected to a hinge point (236) and may fold inwardly when the wheeled container (200) is folded. A tensioning cable (242) may be connected throughout the frame (224). Lower support bars (262) are included between the lower portion of the frame (234) and the back wheel frame addition (260) and are intended to provide a more stable structure. Lower support bars (262) may further include a hinge point (236), and will fold together when the stroller (200) is folded.

Although the tensioning cable (242) is shown outside the frame (224), it will be understood that the design could be modified to have the tensioning cable (242) housed within the frame (224). In this embodiment, a hand actuator (228) is included as a locking mechanism of the tensioning cable (242). The locking mechanism may function in a similar manner to the foot actuator (28) described above. When in a locked position, the hand actuator (228) tightens the tensioning cable (242) across the hinge points (236) and is intended to lock the tensioning cable (242) in a rigid triangular structure with respect to the adjacent frame sections. The tensioning cable (242) may be attached on either end to the hand actuator (228). The hand actuator (228) may activate a toggle lock mechanism when the cable (242) is tightened which may simultaneously lock the various hinge points (236) throughout the frame. The back wheels (256b) may be castor wheels that may be connected to the tensioning cable (242) via a wheel frame (254). The wheel frame (254) may be held in position through a biasing means or spring that is operatively connected to the tensioning cable (242) and may toggle with the activation and release of the hand actuator (228). The front wheels (256a) may be connected to a front wheel frame (254) and may be untethered castor wheels.

Figure 15A:
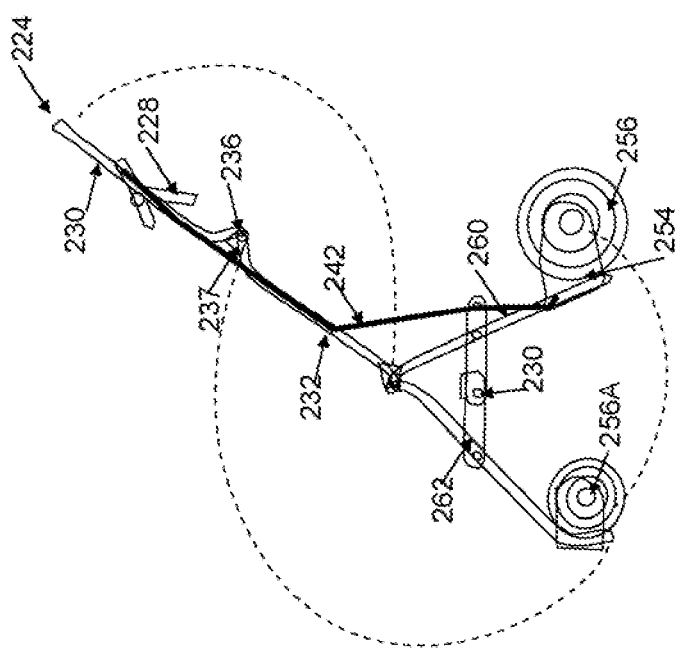
FIGS. 15A to 15C illustrate the side view of the folded wheeled container of FIG. 14 in an unfolded, partially folded and folded position.
Figure 15B:
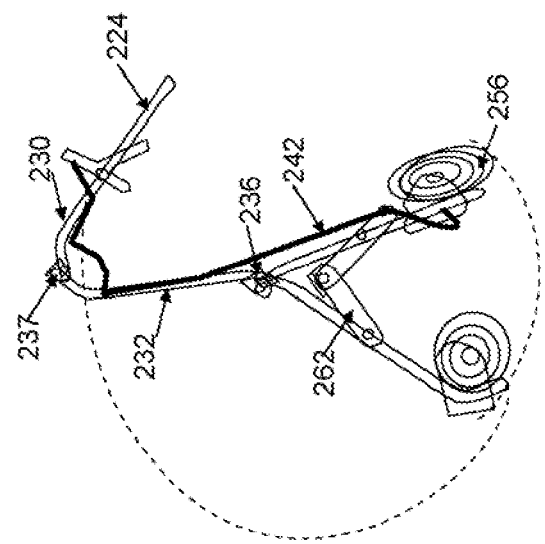
Figure 15C:
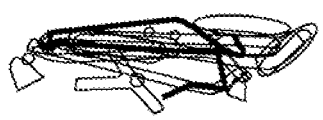

As with the other embodiments of the foldable wheeled container, the locking mechanism allows for the folding and unfolding of the stroller as shown in FIGS. 15A to 15C. When the stroller (200) is locked, as in FIG. 15A, the tensioning cable is tight around the hinge points (236). Once the hand actuator (228) is unlocked, the tensioning cable (242) is loosened and the stroller (200) is able to fold at the hinge points (236). The upper section (230) may fold downward towards the middle section (232) and the lower section (234) may fold forwards towards the middle section (232). The lower support bars (262) may also fold upwards and inwards, as shown in FIG. 15B. The wheels (256) and the respective wheel frames (254) will rotate inwardly when the tensioning cable (242) is loosened. Once fully folded, as shown in FIG. 15C, the stroller may reduce to a size that is more manageable to carry and store. Although the folding positions are shown without the stroller seat (202) and storage compartment (212), it will be understood that the seat (202) and storage compartment (212) do not affect the tensioning cable (242) movement of the locking mechanism action. A retaining device, similar to the retaining device shown on the other embodiments of the foldable wheeled container may be included to lock or snap the stroller (200) in its folded position.

Figure 16C:
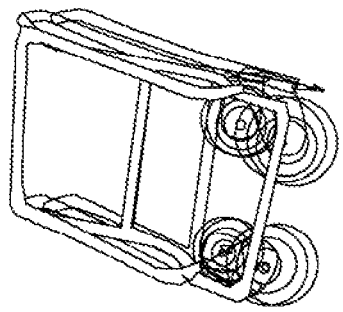
FIG. 16A to 16C illustrate the foldable wheeled container in yet another embodiment.
Figure 16B:
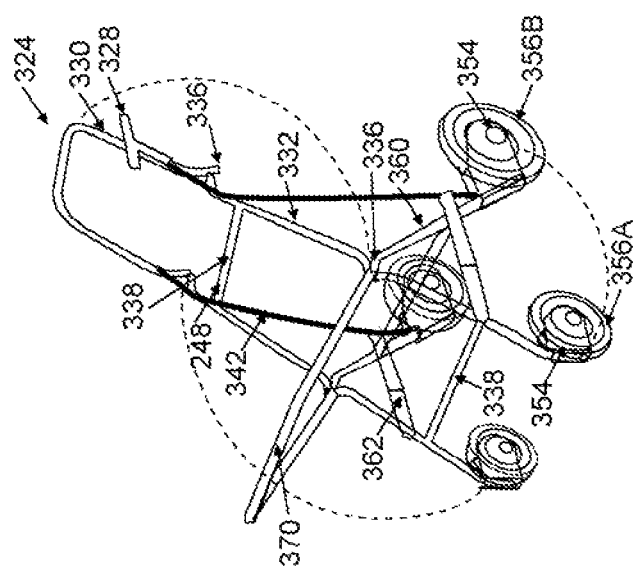
Figure 16A:
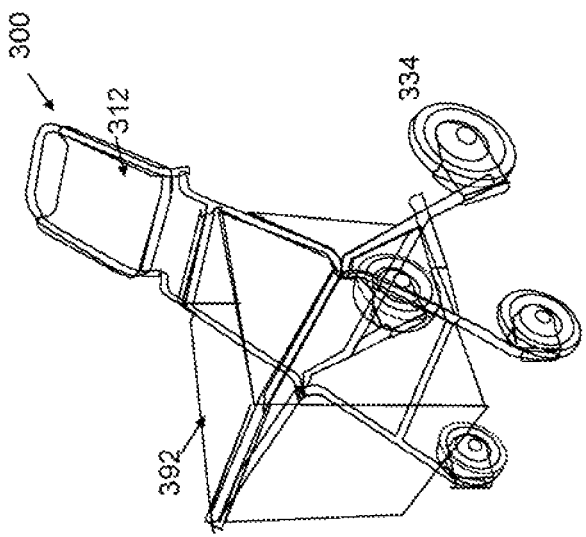

FIG. 16A, shows another alternative of a foldable wheeled container (300). The foldable wheeled container (300) includes a large storage compartment (302) that is connected to a cross bar (338) an additional front frame section (370). The foldable wheeled container may include front and back wheels (356) to provide increased stability and balance over a two-wheeled foldable wheeled container. FIG. 16B illustrates a frame (324) of the foldable wheeled container (300) without the storage compartment (302) or any other compartments (not shown).

The frame (324) of the foldable wheeled container (300) folds in a similar fashion to the stroller (200). A tensioning cable (342) is housed within or connected to a frame (324) and is further connected to a hand actuator (328). The hand actuator (328) works as a locking mechanism. When it is activated, the tensioning cable (342) is tightened and the frame is locked in the unfolded position, as shown in FIG. 16B. The frame includes an upper section (330) that is hingedly connected to a middle section (332) at hinge point (336). The frame (324) may include further hinge points (336) connecting the middle section (332) to the lower section, the back wheel frame (360) and the front frame section (370). A further hinge point (336) may be located in a wheel support bar (362) which connects the lower frame section to the back wheel frame section (360). The frame sections may be connected by a hinge, not shown, which may act as a stopping mechanism during the unfolded stage. The sections of the frame may abut against the hinge, and form a rigid triangular structure with the tensioning cable (342). In the alternative, the frame sections may be directly connected and no hinge may be included.

When the hand actuator is released, the tensioning cable will loosen, allowing the frame sections to fold together as shown in FIG. 16C. The frame sections will rotate about hinge points (336) into a collapsed position. As with the stroller, the back wheels (356b) may be housed within a back wheel frame (354), which may contain a biasing system or spring that when the tensioning cable (342) is taut, the spring will force the wheels into a useable position, and when the tension is released in the tensioning cable (342) the wheels will fold inwardly. The front wheels (356a) may be housed in a front wheel frame (354) similar to the back wheeled frame or may be untethered and allowed to rotate freely. FIG. 16C shows the four wheeled container (300) in a folded position.

In the preceding description, for purposes of explanation, numerous details are set forth in order to provide a thorough understanding of the embodiments. However, it will be apparent to one skilled in the art that these specific details may not be required in order to practice the embodiments. In other instances, some structures may be shown in simplified or block diagram form in order not to obscure the embodiments.

The above-described embodiments are intended to be examples only. Those of skill in the art can effect alterations, modifications and variations to the particular embodiments without departing from the scope, which is defined solely by the claims appended hereto.

We claim:

1. A foldable wheeled container comprising:
   a frame having at least three sections, the at least three sections including an upper section, a middle section and a lower section, the upper section and the lower section being connected to the middle section;
   a set of wheels attached to the frame;
   a tensioning cable integrated with the frame but external to the frame; and
   a locking mechanism connected to the tensioning cable;
   wherein when the locking mechanism is actuated, the tensioning cable aligns the at least three sections in an unfolded position with the cable past pivot points; and
   wherein adjacent frame sections abut against a stop, wherein the stop is designed to create a rigid triangular structure between at least two adjacent frame sections and the tensioning cable.

2. The foldable wheeled container of claim 1 wherein the upper and lower sections are connected to the middle section via hinge points.

3. The foldable wheeled container of claim 1 wherein the locking mechanism is a foot actuator.

4. The foldable wheeled container of claim 1 wherein the locking mechanism is a hand actuator connected to the upper section.

5. The foldable wheeled container of claim 1 wherein the locking mechanism is a rotatable handle.

6. The foldable wheeled container of claim 1 wherein the set of wheels is connected to the frame via a pivotable wheel frame.

7. The foldable wheeled container of claim 1 wherein the set of wheels is connected to the frame via lead-in wheel guides.

8. The foldable wheeled container of claim 1 wherein the set of wheels includes at least four wheels.

9. The foldable wheeled container of claim 1 wherein the frame further comprises a bottom panel to enable use as a hand truck.

10. The foldable wheeled container of claim 1 further comprising a cable tension adjustment device.

11. The foldable wheeled container of claim 1 further comprising a retaining device to hold the foldable wheeled container in a folded position.

12. The foldable wheeled container of claim 1 wherein the container can be folded into a purse, a handbag, a knapsack, an attaché case or a travel hand bag.

13. The foldable wheeled container of claim 2 wherein the tensioning cable aligns the hinge points in the unfolded position.

14. The foldable wheeled container of claim 2 wherein each of the hinge points is located within a hinge.

15. The foldable wheeled container of claim 2 wherein each of the hinge points is located within the stop.

16. The foldable wheeled container of claim 14 wherein adjacent sections abut against the hinge when the frame is unfolded.

17. A stroller comprising:
   a frame having at least two sections;
   at least four wheels connected to the frame;
   a tensioning cable integrally connected to the frame, external to the frame;
   a plurality of hinge points, wherein when the frame rotates around the hinge point the tensioning cable is aligned with the cable past the hinge point; and
   a locking mechanism which tightens and locks the tensioning cable in its tightened position,
   wherein adjacent frame sections abut against a stop, wherein the stop is designed to create a rigid triangular structure between at least two adjacent frame sections and the tensioning cable.

* * * * *